(12) United States Patent
Hiraoglu et al.

(10) Patent No.: US 10,628,545 B2
(45) Date of Patent: Apr. 21, 2020

(54) PROVIDING GUIDANCE TO AN EQUIVALENCE CHECKER WHEN A DESIGN CONTAINS RETIMED REGISTERS

(71) Applicant: Synopsys, Inc., Mountain View, CA (US)

(72) Inventors: Muzaffer Hiraoglu, Chelmsford, MA (US); Darren Charles Cronquist, San Francisco, CA (US); Peter Wilhelm Joseph Zepter, Mountain View, CA (US); Navneet Kakkar, Bangalore (IN); Sridhar Keladi, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/037,936

(22) Filed: Jul. 17, 2018

(65) Prior Publication Data
US 2020/0026813 A1    Jan. 23, 2020

(51) Int. Cl.
*G06F 17/50* (2006.01)

(52) U.S. Cl.
CPC ........ *G06F 17/5059* (2013.01); *G06F 17/505* (2013.01)

(58) Field of Classification Search
USPC ........................................ 716/132
See application file for complete search history.

(56) References Cited

U.S. PATENT DOCUMENTS

| 2012/0198398 | A1* | 8/2012 | Mahar | G06F 17/504 716/102 |
| 2018/0137226 | A1* | 5/2018 | Iyer | G06F 17/5031 |

* cited by examiner

*Primary Examiner* — Bryce M Aisaka
(74) *Attorney, Agent, or Firm* — Park, Vaughan, Fleming & Dowler LLP; Laxman Sahasrabuddhe

(57) ABSTRACT

Systems and techniques are described for providing guidance to an equivalence checker when a design contains retimed registers. Some embodiments can perform at least a register retiming optimization on a first design to obtain a second design. Next, the embodiments can determine one or more codes to provide guidance for connecting the set/clear inputs of the retimed registers. The first design, the second design, and the one or more codes can then be provided to an equivalence checker, wherein providing the one or more codes to the equivalence checker reduces an amount of computation required by the equivalence checker to determine functional equivalence between the first design and the second design.

15 Claims, 6 Drawing Sheets

| Encoding Column 302 (the code) | New SET of retimed register, as function of representative register SET/CLEAR Column 304 (logic function) | New CLEAR of retimed register, as function of representative register SET/CLEAR Column 306 (logic function) | SET/CLEAR contention resolution value of retimed register Column 308 (the contention resolution value) |
|---|---|---|---|
| 0 (3'b000) | 0 | OR(SET, CLEAR) | * |
| 1 (3'b001) | AND(SET, CLEAR) | OR(SET, CLEAR) | 1 |
| 2 (3'b010) | SET | CLEAR | 0 |
| 3 (3'b011) | SET | CLEAR | 1 |
| 4 (3'b100) | CLEAR | SET | 0 |
| 5 (3'b101) | CLEAR | SET | 1 |
| 6 (3'b110) | OR(SET, CLEAR) | AND(SET, CLEAR) | 0 |
| 7 (3'b111) | OR(SET, CLEAR) | 0 | * |

FIG. 3

PROVIDING GUIDANCE TO AN EQUIVALENCE CHECKER WHEN A DESIGN CONTAINS RETIMED REGISTERS

BACKGROUND

Technical Field

This disclosure relates to equivalence checking. More specifically, this disclosure relates to techniques and systems for providing guidance to an equivalence checker when the design contains retimed registers.

Related Art

Advances in process technology and an almost unlimited appetite for computing have fueled a rapid increase in the size and complexity of integrated circuit (IC) designs. The importance of verifying and testing IC designs cannot be over-emphasized. Indeed, it would be impossible to use IC designs in mission-critical devices and applications if IC designs had not been thoroughly verified and tested.

An IC design can be represented by using different data formats and/or description languages at different levels of abstraction. In general, higher levels of abstraction contain fewer details of the IC design than lower levels of abstraction. Typically, the IC design is described at a high level of abstraction in the early stages of an IC design flow, and the level of abstraction becomes progressively lower as the IC design moves through the IC design flow. For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between the two ends of the IC design flow, the IC design may be represented in numerous data formats or languages that describe the same IC design at different levels of abstraction.

Equivalence checking is an important subfield within the field of IC design verification. Equivalence checking involves checking the functional equivalence between two or more circuit designs that are specified at the same or different abstraction levels. For example, equivalence checking can be performed between a register transfer level (RTL) design (higher level of abstraction) and a netlist (lower level of abstraction) that is generated from the RTL design during physical synthesis.

One approach for checking functional equivalence between two circuit designs is to exhaustively simulate the two circuit designs over all possible inputs to ensure that the two or more circuit designs produce the same output whenever their inputs are the same. However, this approach is clearly impractical because it is computationally infeasible (and often impossible) to exhaustively simulate non-trivial circuit designs.

Another approach is to use a formal verification based approach to prove the functional equivalence between the two or more circuit designs. Unfortunately, formal verification approaches often require large amounts of computation when they are used to prove functional equivalence between two circuit designs, especially when proving functional equivalence after performing a register retiming optimization. Hence, what are needed are techniques and systems to efficiently perform equivalence checking without the aforementioned drawbacks.

SUMMARY

A register retiming optimization must preserve the reset state of the circuit design. Proving that the reset state is preserved is an important sub-problem of the overall equivalence checking problem between pre- and post-register-timing-optimization designs. Some embodiments described herein provide techniques and systems for providing guidance to an equivalence checker for proving that the reset state is preserved. Some embodiments can perform a register retiming optimization (and optionally other optimizations) on a first design to obtain a second design. The embodiments can then define a register in the first design to be a representative register. Next, for at least one retimed register in the set of retimed registers, the embodiments can determine: (A) a first code that corresponds to a first logical relationship between (1) the retimed register's asynchronous set input and asynchronous clear input, and (2) the representative register's asynchronous set input and asynchronous clear input; and (B) a second code that corresponds to a second logical relationship between (1) the retimed register's synchronous set input and synchronous clear input, and (2) the representative register's synchronous set input and synchronous clear input. Finally, the embodiments can provide the first design, the second design, the first code, and the second code to an equivalence checker. Providing the first and second codes (which is a form of "guidance") to the equivalence checker reduces an amount of computation required by the equivalence checker to determine functional equivalence between the first design and the second design.

The equivalence checker can then check functional equivalence between the first design and the second design (the equivalence checker uses the codes to speed up equivalence checking as explained below). An error can be reported if the first design is not functionally equivalent to the second design. On the other hand, if the first design is functionally equivalent to the second design, then a sequence of circuit design and manufacturing steps can be initiated that produces a physical integrated circuit chip.

In some embodiments, determining the first code comprises: determining a first logic function that converts (1) the representative register's asynchronous set input and asynchronous clear input into (2) the retimed register's asynchronous set input; determining a second logic function that converts (1) the representative register's asynchronous set input and asynchronous clear input into (2) the retimed register's asynchronous clear input; determining a first contention resolution value for the retimed register; and determining the first code based on the first logic function, the second logic function, and the first contention resolution value. Likewise, determining the second code can comprise: determining a third logic function that converts (1) the representative register's synchronous set input and synchronous clear input into (2) the retimed register's synchronous set input; determining a fourth logic function that converts (1) the representative register's synchronous set input and synchronous clear input into (2) the retimed register's synchronous clear input; determining a second contention resolution value for the retimed register; and determining the second code based on the third logic function, the fourth logic function, and the second contention resolution value.

In some embodiments, determining a code based on two logic functions and a contention resolution value comprises performing a lookup on a table that is stored in a memory of a computer, wherein each entry in the table maps a pair of logic functions and a contention resolution value to a code.

BRIEF DESCRIPTION OF THE FIGURES

FIG. 3 illustrates a table that maps a pair of logic functions and a contention resolution value to a code in accordance with some embodiments described herein.

DETAILED DESCRIPTION

Figure 1A:
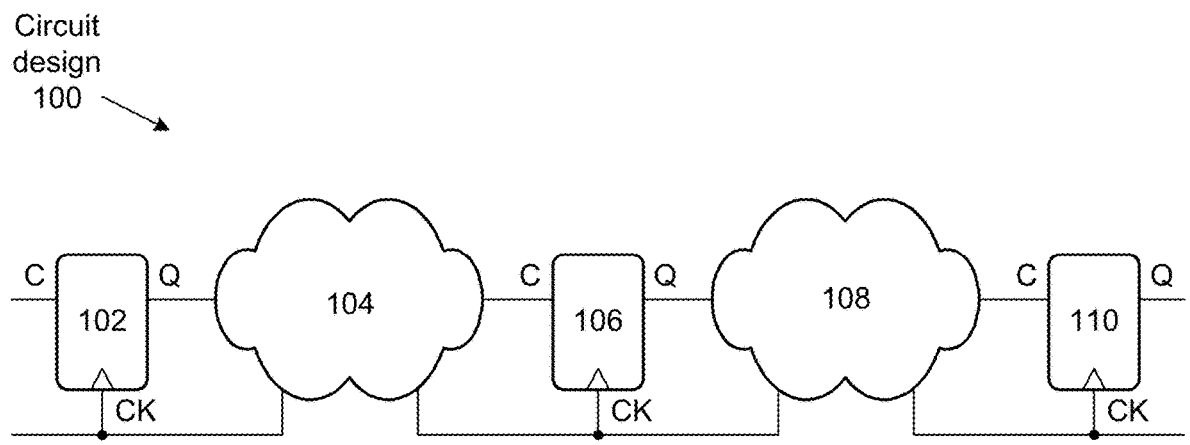
FIG. 1A illustrates a circuit design comprising registers that are coupled via combinational logic clouds in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

An IC design and manufacturing process produces IC chips. Specifically, IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the hardware description language (HDL), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. Some embodiments described herein can be used in this stage, i.e., during synthesis and design for test. During netlist verification, the netlist can be checked for compliance with timing constraints and for correspondence (i.e., equivalence checking) with the RTL design and/or HDL code. If the netlist is functionally equivalent to the RTL design, then the netlist can be provided to the next step in the IC design and manufacturing process. Otherwise, any discrepancies between the netlist and the RTL design can be identified and fixed before proceeding to the next step.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Register Retiming

A circuit design can be viewed as a collection of registers that are coupled via combinational logic clouds. For example, FIG. 1A illustrates a circuit design comprising registers that are coupled via combinational logic clouds in accordance with some embodiments described herein. Circuit design 100 includes registers 102, 106, and 110 that are coupled via combinational logic clouds 104 and 108. During synthesis, the RTL design may undergo multiple optimizations to produce the netlist. To ensure that the netlist produced during synthesis is functionally equivalent to the original RTL design, we may want to formally verify or check the equivalence of the design before and after applying a set of optimizations.

Figure 1B:
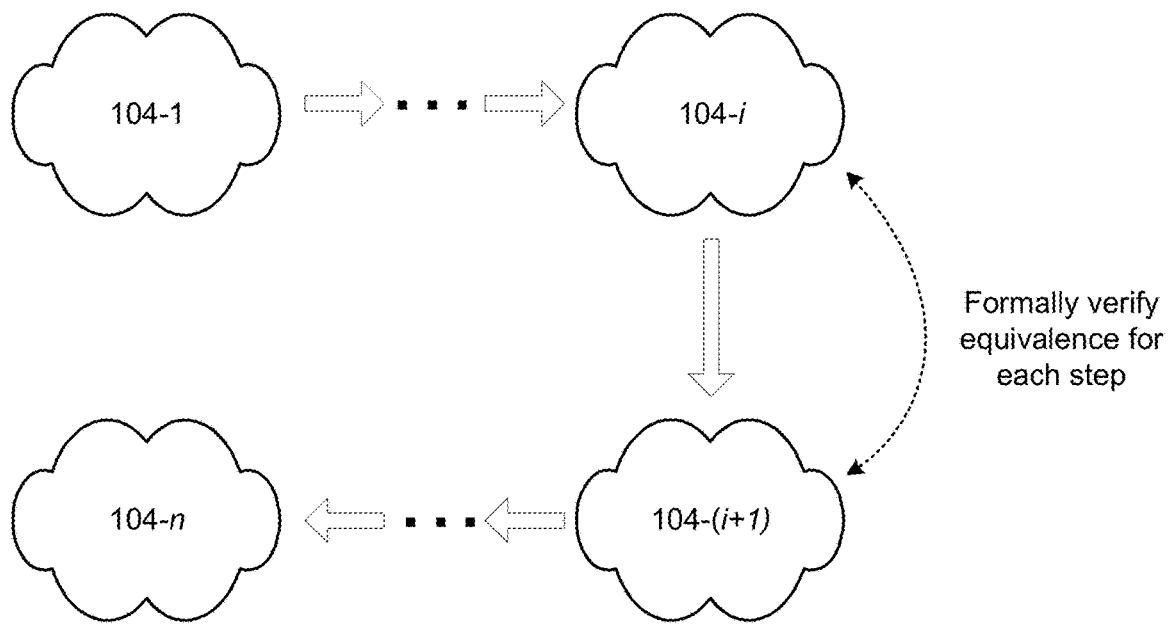
FIG. 1B illustrates how RTL vs. netlist equivalence can be formally verified for each optimization step in accordance with some embodiments described herein.

Separately verifying the RTL vs. netlist equivalence of each combinational logic cloud (e.g., combinational logic clouds 104 and 108) is sufficient to prove the equivalence of the entire RTL vs. netlist designs. Additionally, verifying the RTL vs. netlist equivalence of each combinational logic cloud for each optimization step that is performed during synthesis is also sufficient to prove the equivalence of the initial RTL design vs. the final netlist design because the "functional equivalence" relationship is transitive. FIG. 1B illustrates how RTL vs. netlist equivalence can be formally verified for each optimization step in accordance with some embodiments described herein. In FIG. 1B, combinational logic cloud 104-1 is the initial RTL representation, combinational logic clouds 104-$i$ and 104-($i$+1) are intermediate representations (which can be RTL or netlist representations), and combinational logic cloud 104-$n$ is the final netlist representation that is obtained after performing n steps of synthesis and/or optimization. Formal verification can be performed for each of these steps, e.g., the equivalence between combinational logic clouds 104-$i$ and 104-

($i$+1) can be formally verified for all i, $1 \le i \le (n-1)$. Alternatively, formal verification can be performed after multiple optimization steps have been performed.

The above-described approach of formally verifying each optimization step works if the functionality of the combinational logic cloud does not change in each step, i.e., combinational logic cloud 104-$i$ is functionally the same as combinational logic cloud 104-($i$+1). Register retiming (which is a type of optimization) involves moving a register across combinational logic.

Figure 1C:
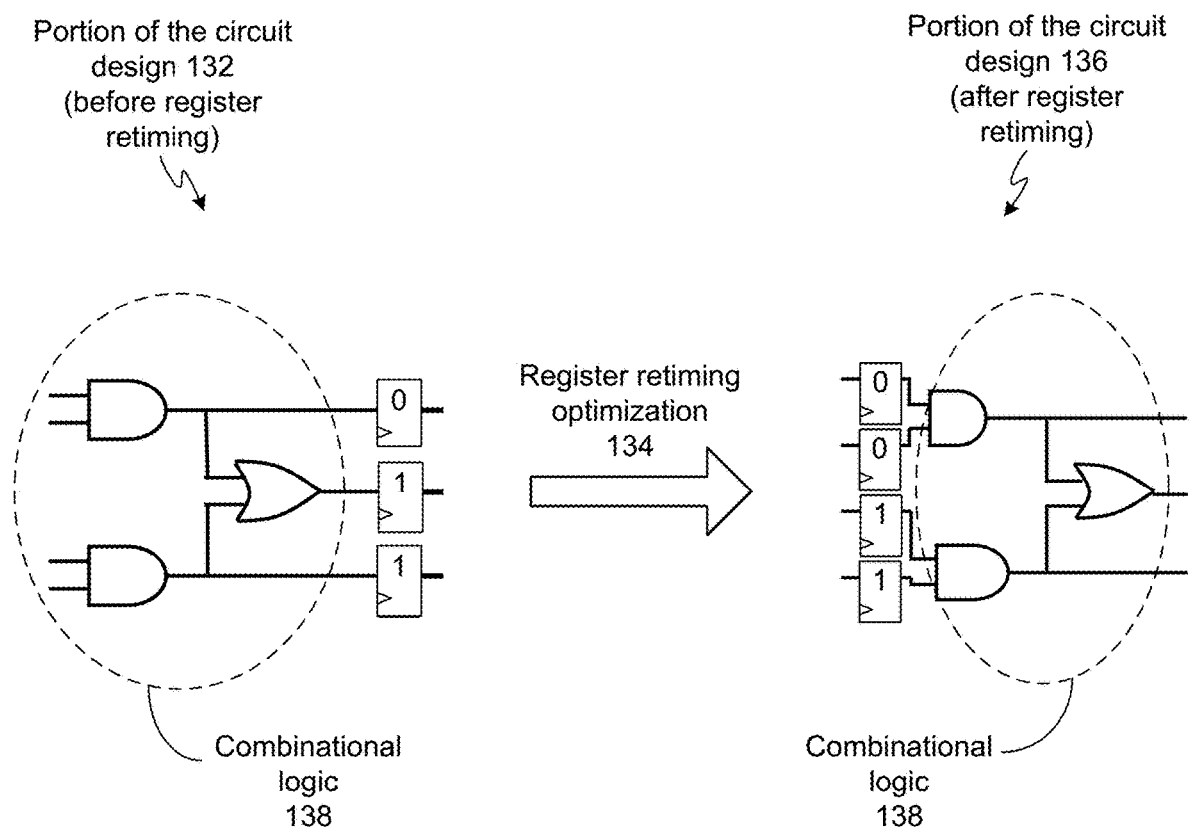
FIG. 1C illustrates an example of register retiming in accordance with some embodiments described herein.

FIG. 1C illustrates an example of register retiming in accordance with some embodiments described herein. Portion of the circuit design 132 illustrates the situation before register retiming is performed. As shown in FIG. 1C, portion of the circuit design 132 includes two AND gates, an OR gate, and three registers, and the numerals shown within the registers denote the reset state. Portion of the circuit design 136 illustrates the situation after register retiming optimization 134 is performed. As shown in FIG. 1C, portion of the circuit design 136 includes two AND gates, an OR gate, and four registers, and the numerals shown within the registers denote the reset state (the reset state is the value that the register is supposed to output when the circuit design is reset). As shown in FIG. 1C, register retiming optimization 134 moves the registers across combinational logic 138.

Figure 1D:
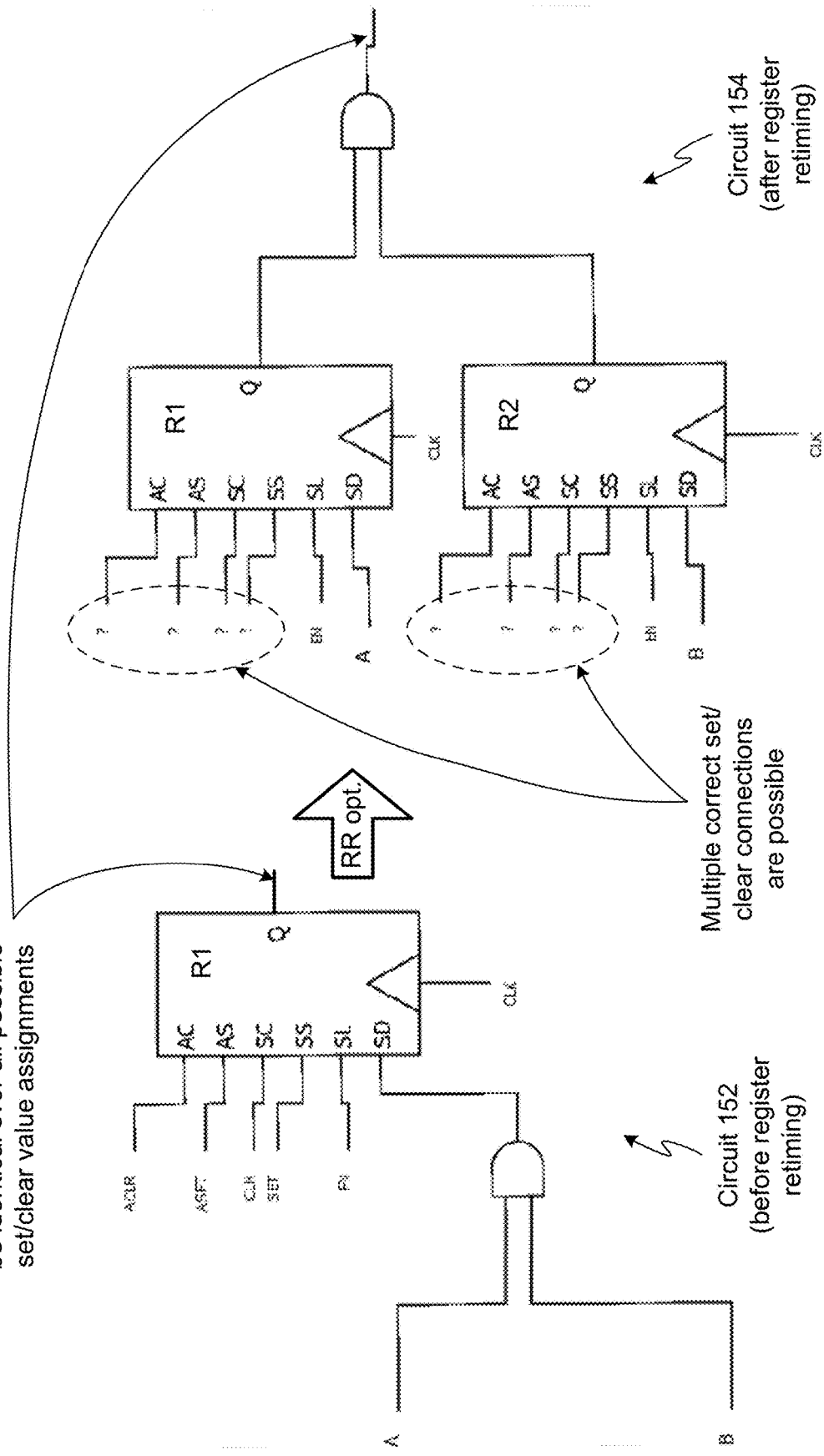
FIG. 1D illustrates an example of preserving the reset state after register retiming in accordance with some embodiments described herein.
Figure 2:
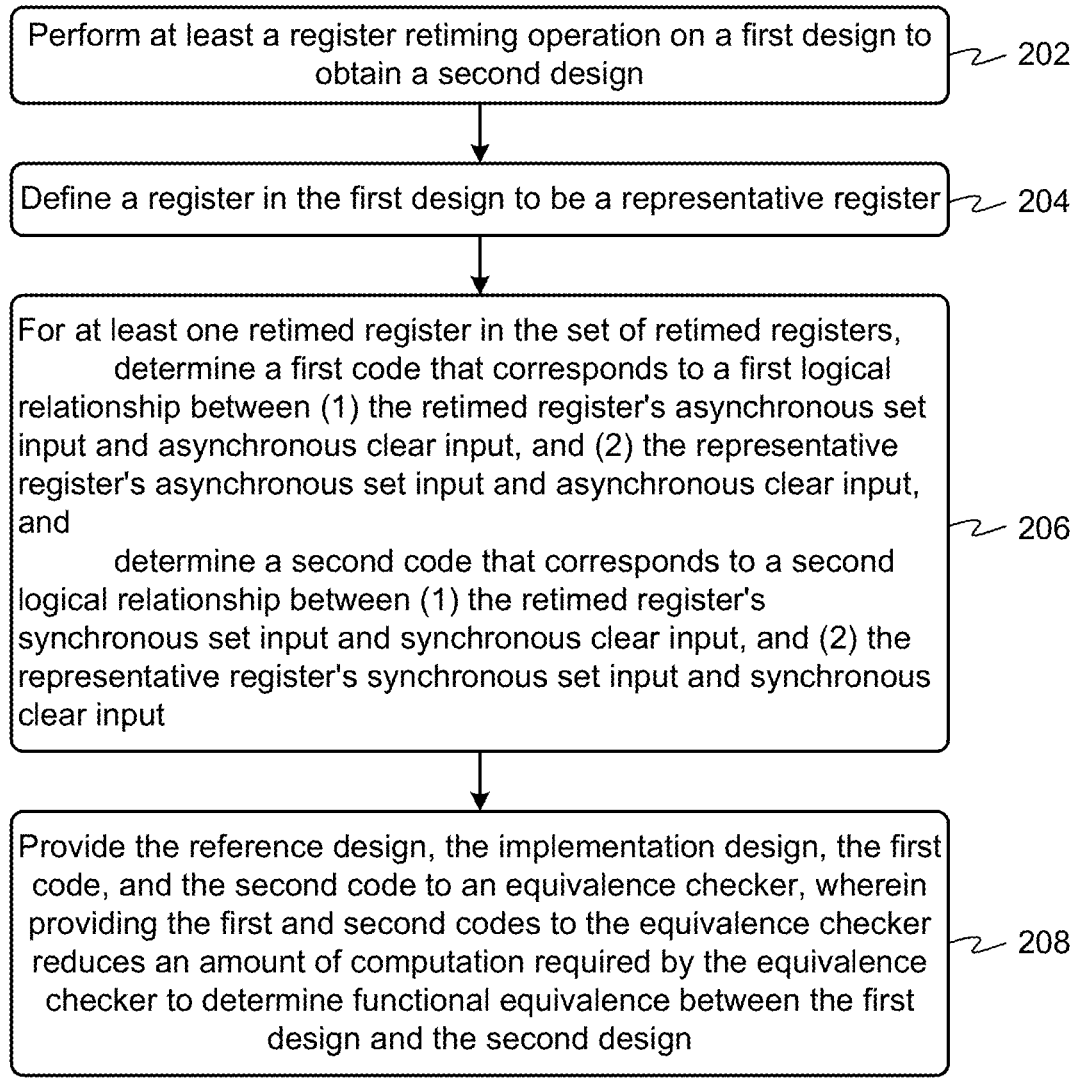
FIG. 2 illustrates a process for providing guidance to an equivalence checker in accordance with some embodiments described herein.

The register retiming optimization must preserve the reset state of the circuit design. However, checking equivalence of the reset state can be difficult when register retiming is performed. FIG. 1D illustrates what is meant by preserving the reset state after a register retiming operation is performed in accordance with some embodiments described herein. Circuit 152 illustrates the situation before register retiming. Circuit 152 includes an AND gate that receives inputs A and B. The register input pins shown in FIG. 1D are as follows: "AC" is asynchronous clear input, "AS" is asynchronous set input, "SC" is synchronous clear input, "SS" is synchronous set input, "SD" is synchronous data input, "SL" is synchronous load input, and "CLK" is the clock input. The output of the AND gate is electrically coupled to the "SD" input of register R1 (the register stores the value that it receives on its "SD" input pin, and outputs the value on its "Q" output pin). Circuit 154 illustrates the situation after register retiming has been performed on circuit 152. Circuit 154 includes the AND gate across which register R1 was moved during the register retiming optimization.

In some embodiments, determining the first code comprises: determining a first logic function that converts (1) the representative register's asynchronous set input and asynchronous clear input into (2) the retimed register's asynchronous set input; determining a second logic function that converts the (1) the representative register's asynchronous set input and asynchronous clear input into (2) the retimed register's asynchronous clear input; determining a first contention resolution value for the retimed register; and determining the first code based on the first logic function, the second logic function, and the first contention resolution value. Likewise, determining the second code can comprise: determining a third logic function that converts (1) the representative register's synchronous set input and synchronous clear input into (2) the retimed register's synchronous set input; determining a fourth logic function that converts the (1) the representative register's synchronous set input and synchronous clear input into (2) the retimed register's synchronous clear input; determining a second contention resolution value for the retimed register; and determining the second code based on the third logic function, the fourth logic function, and the second contention resolution value.

In some embodiments, a code can be determined by performing a lookup on a table, wherein each entry in the table maps a pair of logical functions and a contention resolution value to the code. FIG. 3 illustrates a table that maps a pair of logic functions and a contention resolution value to a code in accordance with some embodiments described herein. In FIG. 3, column 302 contains the code that is returned as the result of the lookup operation, column 304 contains one of the logic functions in the pair, column 306 contains the other logic function in the pair, and column 308 contains the contention resolution value. Without loss of generality, column 304 can correspond to the logic function that converts (1) the representative register's asynchronous/synchronous set input and asynchronous/synchronous clear input into (2) the retimed register's asynchronous/synchronous set input. Likewise, without loss of generality, column 306 can correspond to the logic function that converts the (1) the representative register's asynchronous/synchronous set input and asynchronous/synchronous clear input into (2) the retimed register's asynchronous/synchronous clear input. The contention resolution value can specify the desired value of the retimed register's output when both the asynchronous set input and the asynchronous clear input (or synchronous set input and the synchronous clear input) are asserted at the same time.

Next, the process can provide the first design, the second design, the first code, and the second code to an equivalence checker, wherein providing the first and second codes to the equivalence checker reduces an amount of computation required by the equivalence checker to determine functional equivalence between the first design and the second design (step 208).

Next, the equivalence checker can be used to check functional equivalence between the first design and the second design. Specifically, the equivalence checker can verify that the set/clear behavior specified by the first and second codes is among the possible correct solutions for the retiming move. If the equivalence checker determines that the first design is not functionally equivalent to the second design, then the equivalence checker can report an error, and a design engineer can take appropriate corrective steps to resolve the error. On the other hand, if the equivalence checker determines that the first design is functionally equivalent to the second design, then a sequence of circuit design and manufacturing steps can be initiated that eventually produce a physical integrated circuit chip.

Specifically, if the equivalence checker determines that the set/clear behavior specified by the code is among the possible correct solutions for the retiming move, then the equivalence checker can modify the first design accordingly (i.e., the equivalence checker can connect the retimed register according to the connection specified by the code). Next, the equivalence checker can proceed with checking equivalence of any subsequent optimizations that were performed on the first design.

IC Design System

Figure 4:
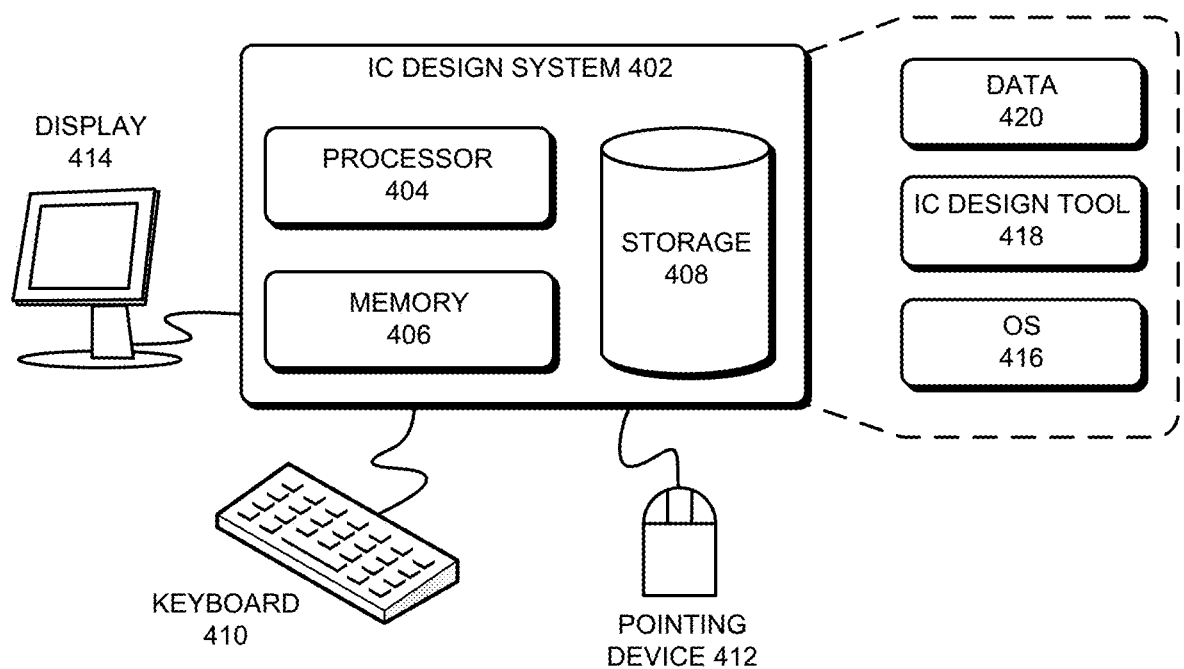
FIG. 4 illustrates an IC design system in accordance with some embodiments described herein.

The term "IC design system" generally refers to a hardware-based system that facilitates the design and manufacture of ICs. FIG. 4 illustrates an IC design system in accordance with some embodiments described herein. IC design system 402 can include processor 404, memory 406, and storage device 408. Specifically, memory locations in memory 406 can be addressable by processor 404, thereby enabling processor 404 to access (e.g., via load/store instructions) and manipulate (e.g., via logical/floating point/arithmetic instructions) the data stored in memory 406. IC design system 402 can be coupled to display device 414, keyboard 410, and pointing device 412. Storage device 408 can store operating system 416, IC design tool 418, and data 620. Data 620 can include input required by IC design tool 418 and/or output generated by IC design tool 418.

IC design system 402 may automatically (or with user help) perform one or more operations that are implicitly or explicitly described in this disclosure. Specifically, IC design system 402 can load IC design tool 418 into memory 406, and IC design tool 418 can then be used to produce a synthesized IC design, wherein the IC design tool 418 can perform equivalence checking between a netlist and an RTL design while producing the synthesized IC design. When the synthesized IC design is manufactured, the resulting IC chips contain the synthesized IC design which was formally verified using techniques and systems described herein (e.g., by using a novel and non-obvious equivalence checker that used the guidance provided by the synthesis tool to speed up equivalence checking).

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for providing guidance to an equivalence checker, the method comprising:
   performing at least a register retiming optimization on a first design to obtain a second design;
   defining a register in the first design to be a representative register;
   for at least one retimed register in a set of retimed registers in the second design,
      determining a first code that corresponds to a first logical relationship between (1) the retimed register's asynchronous set input and asynchronous clear input, and (2) the representative register's asynchronous set input and asynchronous clear input, and
      determining a second code that corresponds to a second logical relationship between (1) the retimed register's synchronous set input and synchronous clear input, and (2) the representative register's synchronous set input and synchronous clear input; and
   providing the first design, the second design, the first code, and the second code to the equivalence checker, wherein providing the first and second codes to the equivalence checker reduces an amount of computation required by the equivalence checker to determine functional equivalence between the first design and the second design.

2. The non-transitory computer-readable storage medium of claim 1, wherein the method further comprises:
   using the equivalence checker to check functional equivalence between the first design and the second design;
   reporting an error in response to determining that the first design is not functionally equivalent to the second design; and
   initiating a sequence of circuit design and manufacturing steps that produce a physical integrated circuit chip in response to determining that the first design is functionally equivalent to the second design.

3. The non-transitory computer-readable storage medium of claim 1, wherein said determining the first code comprises:
   determining a first logic function that converts (1) the representative register's asynchronous set input and asynchronous clear input into (2) the retimed register's asynchronous set input;
   determining a second logic function that converts (1) the representative register's asynchronous set input and asynchronous clear input into (2) the retimed register's asynchronous clear input;
   determining a first contention resolution value for the retimed register; and
   determining the first code based on the first logic function, the second logic function, and the first contention resolution value.

4. The non-transitory computer-readable storage medium of claim 3, wherein said determining the second code comprises:
   determining a third logic function that converts (1) the representative register's synchronous set input and synchronous clear input into (2) the retimed register's synchronous set input;
   determining a fourth logic function that converts (1) the representative register's synchronous set input and synchronous clear input into (2) the retimed register's synchronous clear input;

determining a second contention resolution value for the retimed register; and determining the second code based on the third logic function, the fourth logic function, and the second contention resolution value.

5. The non-transitory computer-readable storage medium of claim 4, wherein a memory of the computer stores a table that maps a pair of logic functions and a contention resolution value to an encoding value, wherein determining the first code comprises performing a lookup in the table by using the first logic function, the second logic function, and the first contention resolution value, and wherein determining the second code comprises performing a lookup in the table by using the third logic function, the fourth logic function, and the second contention resolution value.

6. An apparatus, comprising:

a processor; and a memory storing instructions that, when executed by the processor, cause the processor to perform a method for providing guidance to an equivalence checker, the method comprising:

performing at least a register retiming optimization on a first design to obtain a second design;

defining a register in the first design to be a representative register;

for at least one retimed register in a set of retimed registers in the second design, determining a first code that corresponds to a first logical relationship between (1) the retimed register's asynchronous set input and asynchronous clear input, and (2) the representative register's asynchronous set input and asynchronous clear input, and determining a second code that corresponds to a second logical relationship between (1) the retimed register's synchronous set input and synchronous clear input, and (2) the representative register's synchronous set input and synchronous clear input; and providing the first design, the second design, the first code, and the second code to the equivalence checker, wherein providing the first and second codes to the equivalence checker reduces an amount of computation required by the equivalence checker to determine functional equivalence between the first design and the second design.

7. The apparatus of claim 6, wherein the method performed by the processor further comprises:

using the equivalence checker to check functional equivalence between the first design and the second design;

reporting an error in response to determining that the first design is not functionally equivalent to the second design; and initiating a sequence of circuit design and manufacturing steps that produce a physical integrated circuit chip in response to determining that the first design is functionally equivalent to the second design.

8. The apparatus of claim 6, wherein said determining the first code comprises:

determining a first logic function that converts (1) the representative register's asynchronous set input and asynchronous clear input into (2) the retimed register's asynchronous set input;

determining a second logic function that converts (1) the representative register's asynchronous set input and asynchronous clear input into (2) the retimed register's asynchronous clear input;

determining a first contention resolution value for the retimed register; and determining the first code based on the first logic function, the second logic function, and the first contention resolution value.

9. The apparatus of claim 8, wherein said determining the second code comprises:

determining a third logic function that converts (1) the representative register's synchronous set input and synchronous clear input into (2) the retimed register's synchronous set input;

determining a fourth logic function that converts (1) the representative register's synchronous set input and synchronous clear input into (2) the retimed register's synchronous clear input;

determining a second contention resolution value for the retimed register; and determining the second code based on the third logic function, the fourth logic function, and the second contention resolution value.

10. The apparatus of claim 9, wherein the memory further storing a table that maps a pair of logic functions and a contention resolution value to an encoding value, wherein determining the first code comprises performing a lookup in the table by using the first logic function, the second logic function, and the first contention resolution value, and wherein determining the second code comprises performing a lookup in the table by using the third logic function, the fourth logic function, and the second contention resolution value.

11. A method for providing guidance to an equivalence checker, the method comprising:

performing at least a register retiming optimization on a first design to obtain a second design;

defining a register in the first design to be a representative register;

for at least one retimed register in a set of retimed registers in the second design, determining a first code that corresponds to a first logical relationship between (1) the retimed register's asynchronous set input and asynchronous clear input, and (2) the representative register's asynchronous set input and asynchronous clear input, and determining a second code that corresponds to a second logical relationship between (1) the retimed register's synchronous set input and synchronous clear input, and (2) the representative register's synchronous set input and synchronous clear input; and providing the first design, the second design, the first code, and the second code to the equivalence checker, wherein providing the first and second codes to the equivalence checker reduces an amount of computation required by the equivalence checker to determine functional equivalence between the first design and the second design.

12. The method of claim 11, wherein the method further comprises:

using the equivalence checker to check functional equivalence between the first design and the second design;

reporting an error in response to determining that the first design is not functionally equivalent to the second design; and initiating a sequence of circuit design and manufacturing steps that produce a physical integrated circuit chip in response to determining that the first design is functionally equivalent to the second design.

13. The method of claim 11, wherein said determining the first code comprises:
   determining a first logic function that converts (1) the representative register's asynchronous set input and asynchronous clear input into (2) the retimed register's asynchronous set input;
   determining a second logic function that converts (1) the representative register's asynchronous set input and asynchronous clear input into (2) the retimed register's asynchronous clear input;
   determining a first contention resolution value for the retimed register; and
   determining the first code based on the first logic function, the second logic function, and the first contention resolution value.

14. The method of claim 13, wherein said determining the second code comprises:
   determining a third logic function that converts (1) the representative register's synchronous set input and synchronous clear input into (2) the retimed register's synchronous set input;
   determining a fourth logic function that converts (1) the representative register's synchronous set input and synchronous clear input into (2) the retimed register's synchronous clear input;
   determining a second contention resolution value for the retimed register; and
   determining the second code based on the third logic function, the fourth logic function, and the second contention resolution value.

15. The method of claim 14, wherein a memory of a computer stores a table that maps a pair of logic functions and a contention resolution value to an encoding value,
   wherein determining the first code comprises performing a lookup in the table by using the first logic function, the second logic function, and the first contention resolution value, and
   wherein determining the second code comprises performing a lookup in the table by using the third logic function, the fourth logic function, and the second contention resolution value.

* * * * *